US007864099B2

(12) United States Patent
Colburn et al.

(10) Patent No.: US 7,864,099 B2
(45) Date of Patent: Jan. 4, 2011

(54) LOW COST SHORT RANGE RADAR

(75) Inventors: Joseph S. Colburn, Malibu, CA (US); Hui-Pin Hsu, Northridge, CA (US); Osman D. Altan, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/176,787

(22) Filed: Jul. 21, 2008

(65) Prior Publication Data

US 2009/0021429 A1 Jan. 22, 2009

Related U.S. Application Data

(60) Provisional application No. 60/951,131, filed on Jul. 20, 2007.

(51) Int. Cl.
*G01S 13/00* (2006.01)

(52) U.S. Cl. ......................... 342/70; 342/149; 342/373; 342/427

(58) Field of Classification Search .................. 342/41, 342/70

See application file for complete search history.

(56) References Cited

U.S. PATENT DOCUMENTS

| | | | | |
|---|---|---|---|---|
| 5,248,984 | A * | 9/1993 | Sezai | 342/427 |
| 5,977,904 | A * | 11/1999 | Mizuno et al. | 342/70 |
| 6,498,582 | B1 | 12/2002 | Sweeney et al. | 342/149 |
| 2002/0169578 | A1 * | 11/2002 | Yang | 702/152 |
| 2006/0077097 | A1 * | 4/2006 | Dybdal et al. | 342/359 |
| 2006/0152405 | A1 * | 7/2006 | Egri et al. | 342/70 |
| 2007/0064830 | A1 * | 3/2007 | Choi et al. | 375/267 |
| 2007/0152871 | A1 | 7/2007 | Puglia | 342/70 |
| 2009/0009392 | A1 * | 1/2009 | Jacomb-Hood et al. | 342/374 |

FOREIGN PATENT DOCUMENTS

DE 60302379 T2 6/2006

* cited by examiner

*Primary Examiner*—Thomas H Tarcza
*Assistant Examiner*—Timothy A Brainard
(74) *Attorney, Agent, or Firm*—John A. Miller; Miller IP Group, PLC

(57) ABSTRACT

A low cost radar system that employs monopulse beamforming to detect objects in the road-way both in elevation and azimuth. In one non-limiting embodiment, a beamforming receiver architecture includes a first beamforming device and a plurality of antennas coupled to the first beamforming device, and a second beamforming device and a plurality of antennas coupled to the second beamforming device. The first and second beamforming devices are oriented 90° relative to each other so that the receive beams provided by the first beamforming device detect objects in azimuth and the receive beams provided by the second beamforming device detect objects in elevation. A first switch is provided to selectively couple the sum pattern signal from the first and second beamforming devices to one output line, and a second switch is provided to selectively couple the difference pattern signals from the first and second beamforming devices to another output line.

20 Claims, 4 Drawing Sheets

LOW COST SHORT RANGE RADAR

CROSS-REFERENCE TO RELATED APPLICATIONS

This application claims the benefit of the filing date of U.S. Provisional Patent Application Ser. No. 60/951,131, filed Jul. 20, 2007, titled "Low Cost Short Range Radar."

BACKGROUND OF THE INVENTION

1. Field of the Invention

This invention relates generally to a radar system for automotive applications and, more particularly, to a low cost radar system for automotive applications that employs a transceiver including a receiver having a monopulse beamformer, where the transceiver provides signal processing in both azimuth and elevation.

2. Discussion of the Related Art

Radar systems are known to be employed on vehicles in connection with various systems, such as adaptive cruise control (ACC) systems, collision mitigation and warning systems, automatic braking systems, etc. Radar systems are currently being used on vehicles to provide object detection and warning, and are being investigated for future systems on vehicles, such as ACC systems and collision avoidance systems.

For those vehicle systems where the radar system needs to detect objects in front of the vehicle, such as to provide automatic braking or warnings to prevent a collision, it is necessary that the radar system provide both object detection in the azimuth direction (side-to-side) and object detection in the elevation direction (up and down) to operate successfully. It has heretofore been a design challenge to provide an automotive radar system that is low cost and is able to detect desirable objects, but disregard other objects above a certain elevation, such as over-passes, bridges, hanging signs, etc., that would not interfere with the vehicle travel. Highly complex and advanced radar systems, such as phased arrays, employing several antenna elements that include phase shifters and complex signal processing are known in the art that can detect and eliminate objects above a certain elevation. However, such complex radar systems are typically not suitable for use in vehicles because of their cost and complexity.

It has been proposed in the art to provide a simple radar system for vehicles that disregards all targets that are stationary so that elevated stationary targets are not processed by the system. However, a desirable adaptive cruise control or collision avoidance system would need to detect many types of stationary objects to be effective. It is also possible to limit the usable range of radar beams in elevation so that the system will not capture or process objects above a certain elevation because of only using a limited portion of the diverging beam. However, it is desirable in many of these systems to detect certain objects in the road-way that are a significant distance in front of the vehicle. It has further been proposed in the art to provide sensor fusion where radar detection is fused with other detecting devices, such as cameras, to eliminate those objects that are above a certain elevation that extend over the road-way. However, such systems are also very complex, and usually not suitable for automotive applications.

SUMMARY OF THE INVENTION

In accordance with the teachings of the present invention, a low cost radar system is disclosed that employs monopulse beamforming to detect objects in the road-way both in elevation and azimuth. In one non-limiting embodiment, a beamforming receiver architecture includes a first beamforming device and a plurality of antennas coupled to the first beamforming device, and a second beamforming device and a plurality of antennas coupled to the second beamforming device. The first and second beamforming devices are oriented 90° relative to each other so that the receive beams provided by the first beamforming device detect objects in azimuth and the receive beams provided by the second beamforming device detect objects in elevation. A first switch is provided to selectively couple the sum pattern signal from the first and second beamforming devices to one output line, and a second switch is provided to selectively couple the difference pattern signals from the first and second beamforming devices to another output line. In this way a single set of receiver electronics connected to the sum and difference patterns output lines can be used to get both azimuth and elevation information. In this arrangement, only a single fixed transmit beam is needed to illuminate the scene.

Additional features of the present invention will become apparent from the following description and appended claims taken in conjunction with the accompanying drawings.

DETAILED DESCRIPTION OF THE EMBODIMENTS

The following discussion of the embodiments of the invention directed to a low cost radar system for automotive applications that employ a monopulse beamformer in a receiver with a simple single beam transmitter and provides object detection in both azimuth and elevation is merely exemplary in nature, and is in no way intended to limit the invention or its applications or uses.

Figure 1:
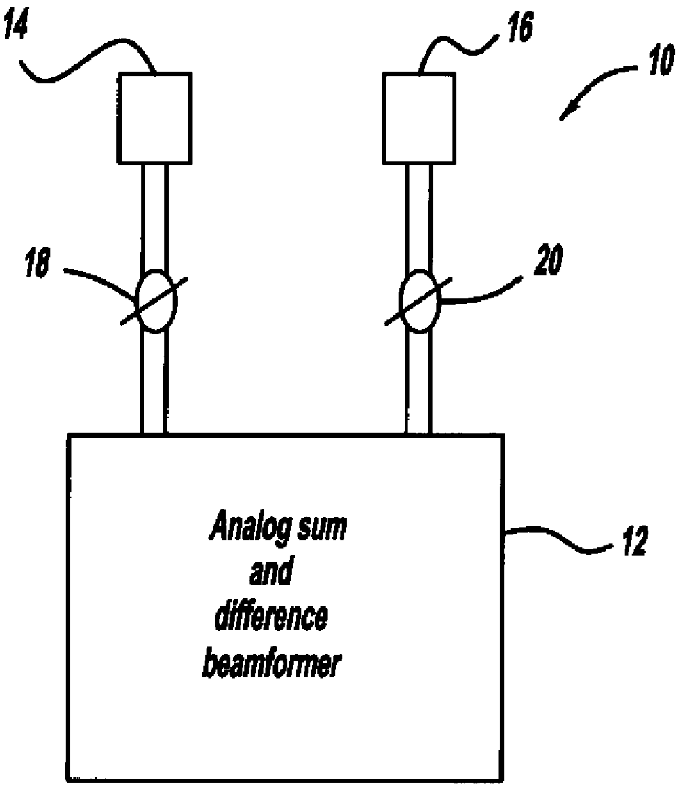
FIG. 1 is a schematic plan view of a radar receiver that employs a traditional analog sum and difference beamformer to provide monopulse sum and difference beam patterns with additional phase shift added between the input channels of the monopulse beamformer to steer the beams off bore-sight.

FIG. 1 is a block diagram of a receiver architecture 10 for a radar transceiver that is applicable for automotive applications. For certain radar transceivers, it is desirable to make the transmitter a simple transmitting device, and place the complexity for signal processing in the receiver architecture. The receiver architecture 10 includes a traditional analog sum and difference beamformer 12 that provides analog monopulse beamforming from receive signals received by two antennas 14 and 16. The antennas 14 and 16 could consist of one or more individual elements depending on the required antenna beamwidth. Signals received by the antennas 14 and 16 are sent to a traditional monopulse beamformer 12 through phase shifters 18 and 20, respectively, that change the phase of the receive signals for monopulse processing in manner that will be discussed in detail below.

Radar monopulse signal processing includes comparing receive beams generated by at least two antennas when the signals received by the antennas are in phase and are 180° out of phase. When the receive signals are combined in phase, the receive beams are directed along an antenna bore-sight typically directly in front of the vehicle. When the signals are 180° out-of-phase there is a null along the antenna bore-sight, but the phase difference creates beam side-lobes on either side of the bore-sight. When the signals received from targets are compared between the receive beams that are combined in-phase (sum pattern) relative to the receive beam and that are combined out-of-phase (difference pattern), the direction of the target relative to the bore-sight can be determined. It is the relative amplitude and phase of the signals that gives the specific direction of the target relative to the antenna bore-sight. The traditional beamformer 12 is able to provide the required target monopulse signals by dividing the beams received by each antenna and combining them both with a 0 and 180 degree phase shift to create the sum and difference patterns. By adding an additional relative phase shift between the signals from the two antennas, the sum and difference patterns can be scanned to off bore-sight angles to improve the angular accuracy for off bore-sight targets.

Figure 2:
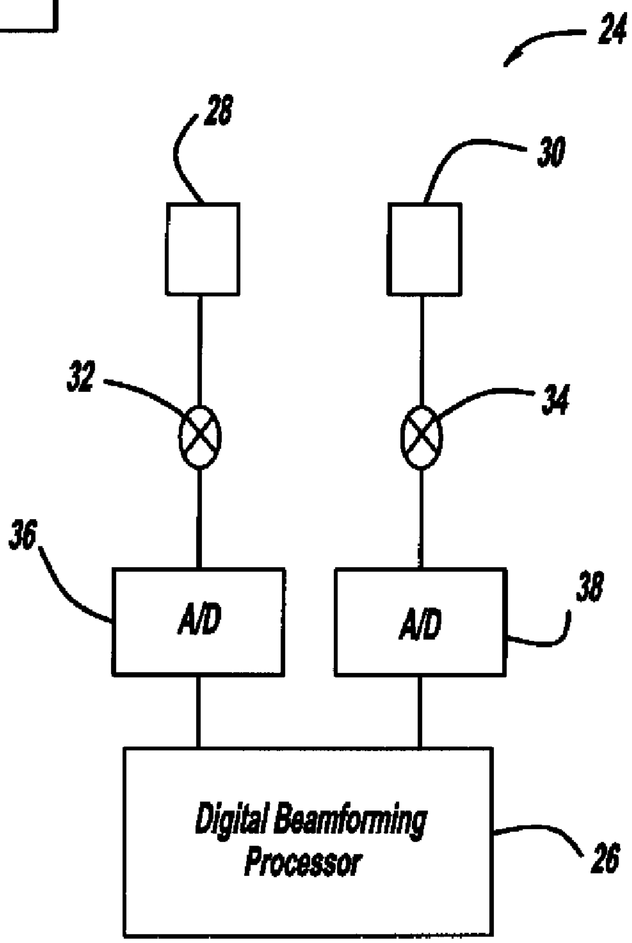
FIG. 2 is a schematic plan view of a radar receiver that employs a digital processor to generate the monopulse sum and difference beam patterns with additional phase shifting to steer the sum and difference patterns off bore-sight.

FIG. 2 is a block diagram of a receiver architecture 24 that includes a digital processor 26 to perform the monopulse beamforming and steering in the digital domain. Signals are received by antennas 28 and 30 that are down-converted by down-converters 32 and 34, respectively. As previously mentioned, the antennas 28 and 30 could consist of multiple array elements depending on the antenna beamwidth required. The receive signals are converted to digital signals by analog-to-digital converters 36 and 38, where the digital signals are sent to the digital processor 26. The processor 26 is able to perform the monopulse signal processing using signals from the antennas 28 and 30 to provide the sum and difference beams that are then compared to identify targets along or near the bore-sight of the antennas 28 and 30. Additionally, the relative phase shift between the signal from the antennas 28 and 30 can be applied to steer the sum and difference patterns off bore-sight in the digital domain.

The receiver architectures 10 and 24 provide a simple technique for using the monopulse process to detect a target with greater accuracy than the traditional monopulse approach since the sum and difference patterns can be steered off bore-sight. However, the target detection direction is only in a single plane, such as the azimuth plane. Additional antennas and beamformers may be necessary to provide monopulse processing in both azimuth and elevation, desirable for automotive applications.

Figure 3:
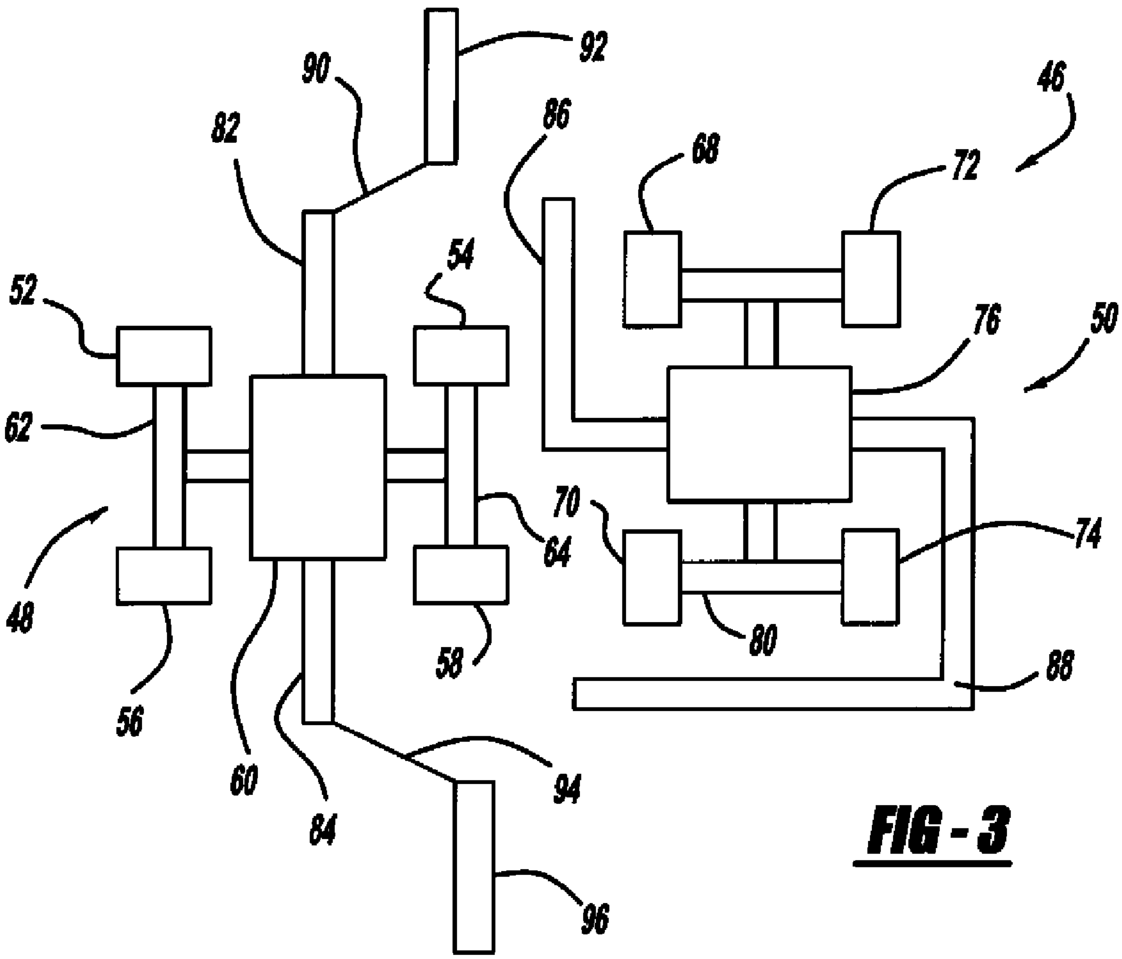
FIG. 3 is a plan view of a receiver architecture for a radar system that includes two beamforming units, one for azimuth and one for elevation, according to an embodiment of the present invention.

FIG. 3 is a plan view of a receiver architecture 46 that includes a first antenna array and beamformer 48 and a second antenna array and beamformer 50 that operate based on the traditional monopulse techniques with additional phase shifting to steer the sum and difference patterns, as discussed above. In this embodiment, the antenna array and beamformer 48 provides monopulse processing in the azimuth direction and the antenna array and beamformer 50 provides monopulse processing in the elevation direction.

The antenna array and beamformer 48 includes four antennas 52, 54, 56 and 58 and a beamformer 60 that can be either an analog beamformer or a digital beamformer of the type discussed above. The antennas 52 and 56 combine to form one beam and the antennas 54 and 58 combine to form another beam to provide the two beams for the monopulse processing. The antennas 52 and 56 are coupled to the beamformer 60 by a transmission line 62 and the antennas 54 and 58 are coupled to the beamformer 60 by a transmission line 64.

The antenna array and beamformer 50 includes antennas 68, 70, 72 and 74 and a beamformer 76. The antennas 68 and 72 combine to form one beam and the antennas 70 and 74 combine to form another beam to provide the two beams for monopulse processing. The antennas 68 and 72 are coupled to the beamformer 76 by a transmission line 78 and the antennas 70 and 74 are coupled to the beamformer 76 by a transmission line 80.

The antenna array and beamformer 48 provides the target signals of the sum and difference patterns in the horizontal plane on transmission line 82 and on transmission line 84, respectively. Likewise, the antenna array and beamformer 50 provides the target signals of the sum and difference patterns in the vertical plane on transmission line 86 and transmission line 88, respectively. Depending on which direction, azimuth or elevation, the radar system is currently detecting, a switch 90 switches the sum beam in the azimuth direction and the elevation direction to an output transmission line 92, and a switch 94 switches the difference beam in the azimuth and the elevation direction to an output transmission line 96. In this way a single set of monopulse receiver electronics can be used to determine both azimuth and elevation information about the target with a single fixed transmit beam.

Figure 4:
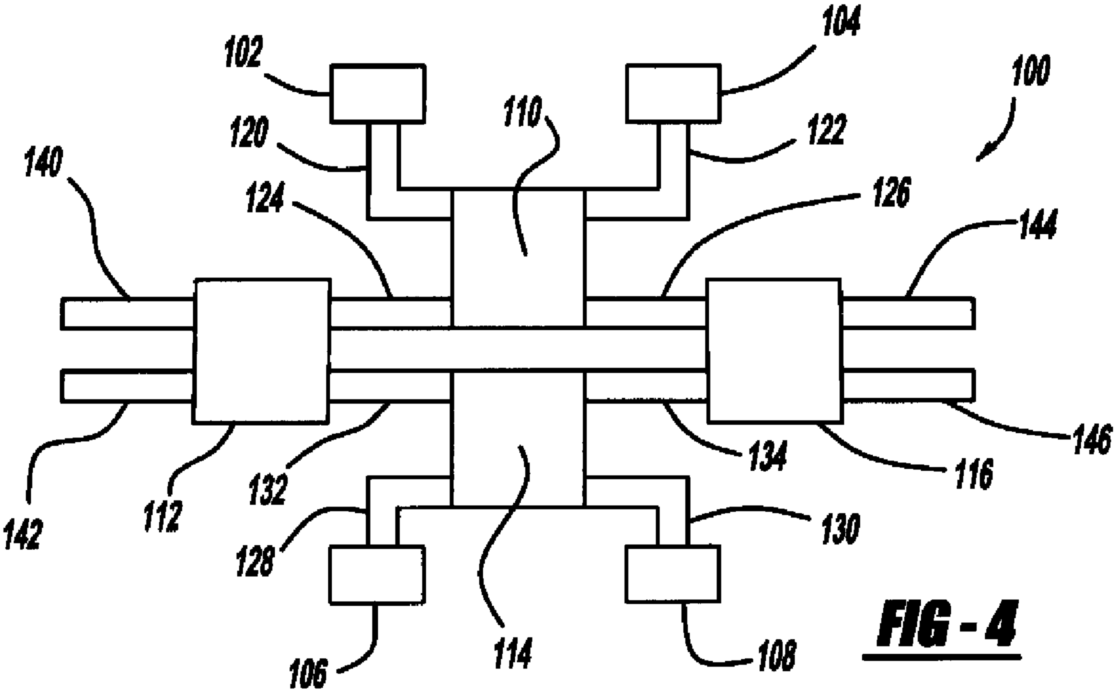
FIG. 4 is a plan view of a receiver architecture for a radar system that includes four antennas and four beamformers for providing monopulse signal processing in both azimuth and elevation, according to another embodiment of the present invention.

FIG. 4 is a plan view of an antenna and beamformer 100 for a radar system including an array of four antennas 102, 104, 106 and 108 and four beamformers 110, 112, 114 and 116. In this embodiment, by providing the four beamformers 110, 112, 114 and 116, the array of antennas 102, 104, 106 and 108 can provide receive beams in both azimuth and elevation using monopulse processing. The antennas 102 and 104 provide target signals on transmission lines 120 and 122, respectively, to the beamformer 110. The beamformer 110 provides the sum beam target signals on transmission line 124 and the difference beam target signals on transmission line 126. Likewise, the target signals received by the antennas 106 and 108 are sent to the beamformer 114 on transmission lines 128 and 130, respectively. The beamformer 114 provides the sum beam target signals on transmission line 132 and the difference beam target signals on transmission line 134. The sum beam signals on the transmission lines 124 and 132 are sent to the beamformer 112, which provides the sum beam signals on transmission line 140 for the elevation difference beam signal on transmission line 142. Likewise, the difference beam signals on the transmission lines 126 and 134 are sent to the beamformer 116, which provides the azimuth difference beam signals on transmission line 144 (the sum port of the beamformer 116). By using a single set of monopulse receive electronics that is connected to the sum beam signal 140 and switches between the elevation 142 and azimuth 144 difference beam patterns, both the azimuth and elevation position of a target can be determined with a single fixed beam transmitter.

Figure 5:
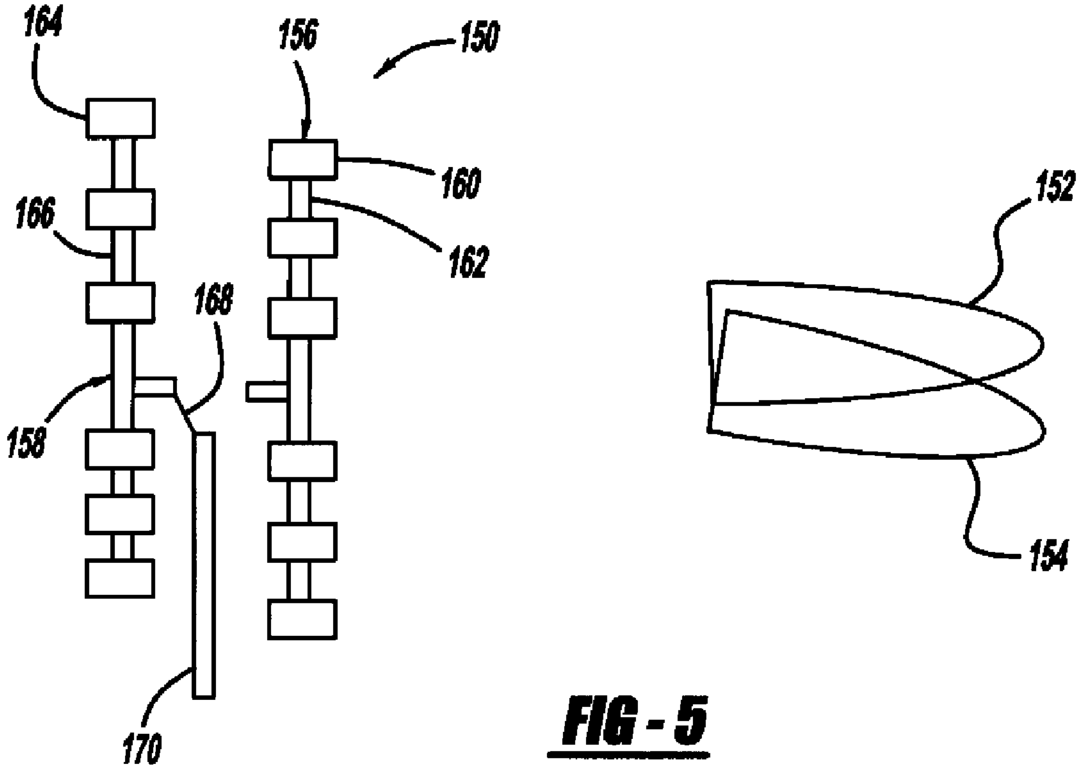
FIG. 5 is a plan view of a transmitter architecture for a radar system employing a first antenna array for a first beam and a second antenna array for a second beam that provide object detection in elevation, according to another embodiment of the present invention.

FIG. 5 is a plan view of a transmitter architecture 150 that provides two separate beams 152 and 154 in different directions to provide scene illumination at two different elevation angles. In this embodiment, a receiver, such as the type shown in either FIG. 1 or 2, could be used that is capable of providing monopulse processing of signals in an azimuth direction in combination with the aforementioned dual elevation beam transmitter to get both azimuth and elevation information about the targets. The transmitter architecture 150 includes a first antenna 156 that generates the beam 152 and a second antenna 158 that generates the beam 154. The transmitter 156 includes a plurality of planar antenna elements 160 positioned along a transmission line 162 where the distance between the antenna elements 160 defines the phase relationship between the antenna elements 160, and thus the direction of the beam 152. The more antenna elements that are used in the transmitter or the receiver, the narrower and higher power the beam is in a particular direction.

The transmitter 158 also includes a plurality of antenna elements 164 positioned along a transmission line 166, where the distance between the antenna elements 164 defines the phase relationship between the antenna elements 164 and provides the direction of the beam 154. Thus, the beam 152 can be directed along the vehicle's bore-sight in elevation, and the beam 154 can be directed towards the ground to determine whether a detected object is on the ground. The transceiver architecture 150 includes a switch 168 that switches between the transmitters 156 and 158 so that a transmit signal on a transmission input line 170 is transmitted by the transmitter 156 or 158.

Figure 6:
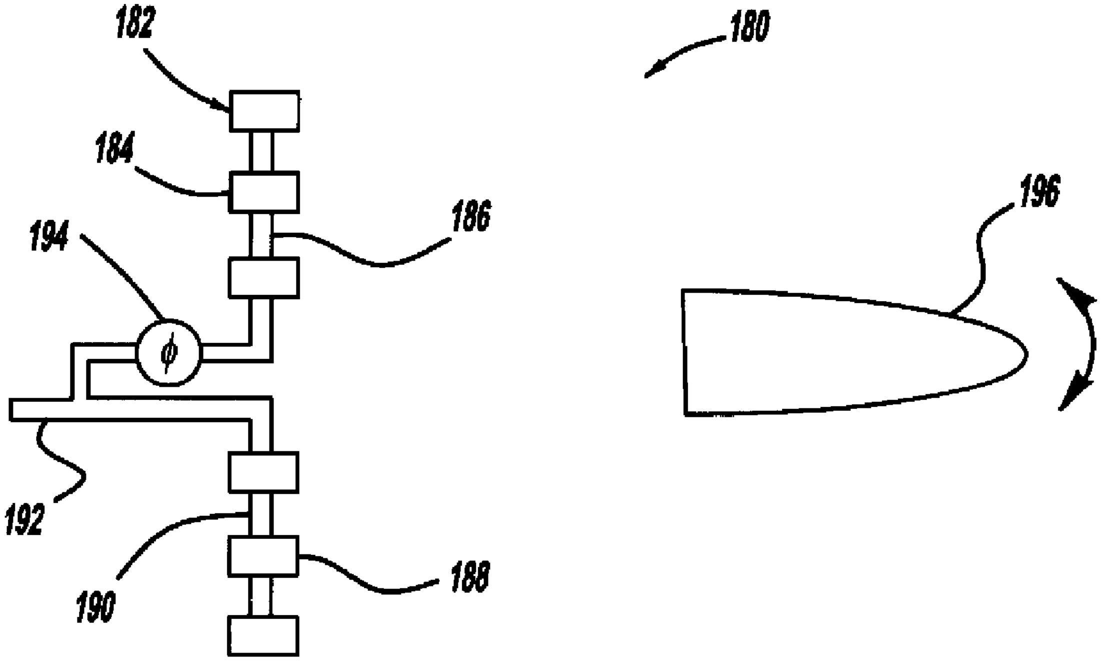
FIG. 6 is a plan view of a transmitter architecture for a radar system that includes a phase shifter for steering a beam to provide object detection in elevation, according to another embodiment of the present invention.

FIG. 6 is a plan view of a transmitter architecture 180 that employs the principle of the transmitter architecture 150, but with a single antenna 182. The transmitter architecture 180 could be used in a transceiver with an azimuth only monopulse receiver, such as the type shown in FIGS. 1 and 2, to get both azimuth and elevation information. The transmitter 182 includes a number of antenna elements 184 (three shown) coupled to a transmission line 186 and another number of antenna elements 188 (three shown) coupled to a transmission line 190. The transmission line 186 and the transmission line 188 are coupled to a common input transmission line 192. A phase shifter 194 is provided in the transmission line 186 so as to provide a controllable phase shift between the antenna elements 184 and the antenna elements 188 that allows a beam 196 to be steered in elevation over a limited angular depending on the size of the antenna elements 184 and 188.

Figure 7:
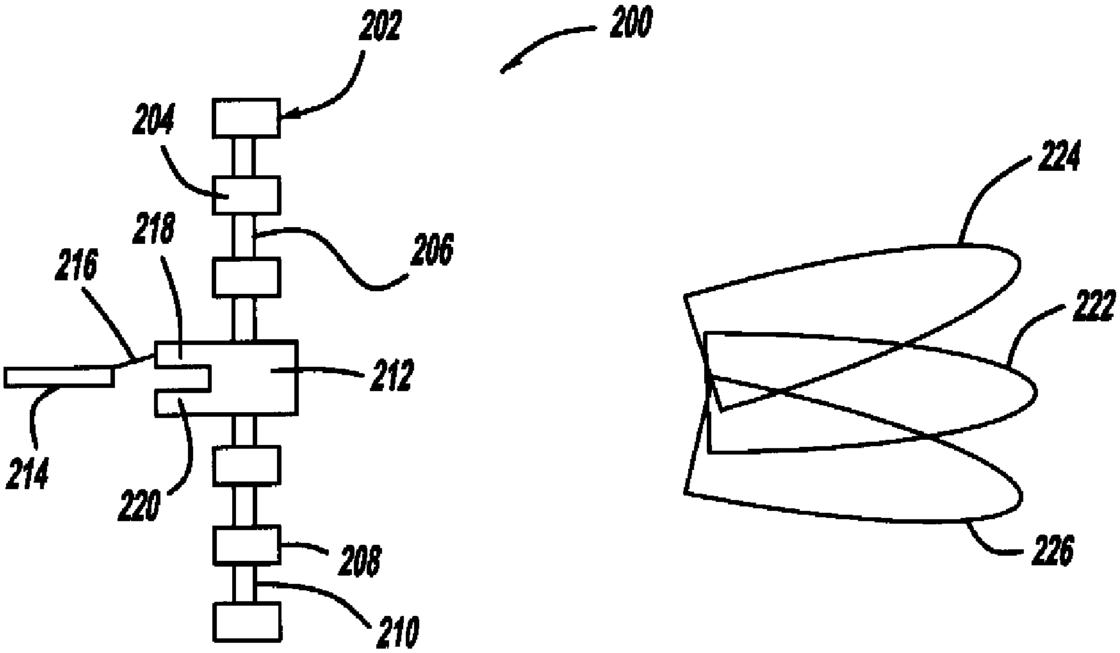
FIG. 7 is a plan view of a transmitter architecture for a radar system that includes an analog monopulse beamformer that provides sum and difference beams that detect an object in elevation, according to another embodiment of the present invention.

FIG. 7 is a plan view of a transmitter architecture 200 that can transmit signals in either a sum or difference pattern depending on the position of a switch 216 positioned to provide difference scene illumination in elevation. The transmitter architecture 200 could be used in a transceiver with an azimuth only monopulse receiver, such as shown in FIGS. 1 and 2, to get both azimuth and elevations information. The transmitter architecture 200 includes a transmitter 202 having antenna elements 204 coupled to one transmission line 206 and antenna elements 208 coupled to another transmission line 210. An analog monopulse beamformer 212 is provided between the transmission lines 206 and 210. A signal to be transmitted is provided on an input transmission line 214. The switch 216 switches between an in-phase port 218 and an out-of-phase port 220 of the beamformer 212. When the switch 216 is switched to the in-phase port 220, then the transmitter 202 provides a beam 222 parallel to the ground in front of the vehicle. When the switch 216 is switched to the out-of-phase port 218, the transmitter 202 generates two beams 224 and 226 with a null in between. Therefore, targets in front of the vehicle can be detected in elevation as a result of switching between the sum and difference beam patterns.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A receiver architecture comprising:

a first receiver including a first beamforming device and a plurality of antennas coupled to the first beamforming device, said plurality of antennas in the first receiver providing at least two beams in a first direction;

a second receiver including a second beamforming device and a plurality of antennas coupled to the second beamforming device, said second receiver being oriented 90° relative to the first receiver and providing at least two beams in a second direction;

a first switch configured to selectively switch between in-phase beams from the first and second beamforming devices to a first output line; and a second switch configured to selectively switch between out-of-phase beams from the first and second beamforming devices to a second output line.

2. The receiver architecture according to claim 1 wherein the first and second beamforming devices are selected from the group comprising analog beamformers and digital beamformers.

3. The receiver architecture according to claim 1 wherein the first receiver and the second receiver each include four antennas where two of the antennas combine to form one beam and two of the antennas combine to form another beam.

4. The receiver architecture according to claim 1 wherein the antennas are patch antennas.

5. The receiver architecture according to claim 1 wherein the first receiver provides beams in an azimuth direction and the second receiver provides beams in an elevation direction.

6. The receiver architecture according to claim 5 wherein the receiver architecture is part of a radar system on a vehicle.

7. The receiver architecture according to claim 1 wherein the first beamforming device and the second beamforming device generate the in-phase and the out-of-phase beams by monopulse processing.

8. A receiver architecture comprising:

at least two antennas providing radiation beams relative to an antenna bore-sight;

at least one beamforming device employing monopulse beamforming, said beamforming device processing signals received by the antennas, wherein the beamforming device provides an in-phase output signal when the radiation beams provided by two antennas are in-phase with each other and provides an out-of-phase output signal when the radiation beams of the two antennas are 180° out-of-phase with each other;

a first switch configured to selectively switch between in-phase radiation beams in a first direction to an in-phase output line, and in-phase radiation beams in a second direction to the in-phase output line; and a second switch configured to selectively switch between out-of-phase radiation beams in the first direction to an out-of-phase output line, and out-of-phase radiation beams in the second direction to the out-of-phase output line.

9. The receiver architecture according to claim 8 wherein the at least one beamforming device is selected from the group comprising analog beamforming devices and digital beamforming devices.

10. The receiver architecture according to claim 8 wherein the at least two antennas are four antennas, where two of the antennas combine to provide one radiation beam and two of the antennas combine to provide another radiation beam.

11. The receiver architecture according to claim 8 wherein the antennas are patch antennas.

12. The receiver architecture according to claim 8 wherein the at least two antennas and the at least one beamforming device are four antennas and one beamforming device in one receiver that provides monopulse processing in the first direction and four antennas and one beamforming device in another receiver that provides monopulse processing in a the second direction.

13. The receiver architecture according to claim 8 wherein the at least two antennas is four antennas and the at least one beamforming device is four beamforming devices that combine to provide signal detection in two directions.

14. The receiver architecture according to claim 8 wherein the receiver architecture is part of a radar system on a vehicle.

15. A receiver for a radar system on a vehicle, said receiver comprising:

a plurality of antennas providing at least two radiation beams relative to an antenna bore-sight;

a plurality of beamforming devices that employ monopulse beamforming, wherein the receiver causes the radiation beams to be in-phase and combine along the antenna bore-sight and to be 180° out-of-phase to provide beam side-lobes relative to the antenna bore-sight so that at least one beamforming device provides in-phase and out-of-phase signals in an azimuth direction and at least one beamforming device provides in-phase and out-of-phase signals in an elevation direction;

a first switch configured to selectively switch between in-phase signals in the azimuth direction with in-phase signals in the elevation direction; and a second switch configured to selectively switch between out-of-phase signals in the azimuth direction with out-of-phase signals in the elevation direction.

16. The receiver according to claim 15 wherein the plurality of beamforming devices are selected from the group comprising analog beamforming devices and digital beamforming devices.

17. The receiver according to claim 15 wherein the plurality of antennas are four antennas, where two of the antennas combine to provide one radiation beam and two of the antennas combine to provide another radiation beam.

18. The receiver according to claim 15 wherein the plurality of antennas are patch antennas.

19. The receiver according to claim 15 wherein the plurality of antennas and the plurality of beamforming device are four antennas and one beamforming device that provides monopulse processing in a first direction and four antennas and one beamforming device that provides monopulse processing in a second direction.

20. The receiver according to claim 15 wherein the plurality of antennas is four antenna elements and the plurality of beamforming devices is four beamforming devices that combine to provide signal detection in two directions.

* * * * *